US008085801B2

(12) United States Patent
Brueggen

(10) Patent No.: US 8,085,801 B2
(45) Date of Patent: Dec. 27, 2011

(54) RESOURCE ARBITRATION

(75) Inventor: Chris Michael Brueggen, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 264 days.

(21) Appl. No.: 12/538,116

(22) Filed: Aug. 8, 2009

(65) Prior Publication Data

US 2011/0032947 A1   Feb. 10, 2011

(51) Int. Cl.
*H04L 12/28* (2006.01)
(52) U.S. Cl. ........................ 370/412; 370/418
(58) Field of Classification Search .................. None
See application file for complete search history.

(56) References Cited

U.S. PATENT DOCUMENTS

| | | | |
|---|---|---|---|
| 5,835,491 A | 11/1998 | Davis | |
| 6,073,199 A * | 6/2000 | Cohen et al. | 710/113 |
| 6,744,728 B1 | 6/2004 | Chung | |
| 6,912,225 B1 | 6/2005 | Kohzuki | |
| 6,992,984 B1 * | 1/2006 | Gu | 370/235 |
| 7,263,097 B1 | 8/2007 | Ornes | |
| 7,327,749 B1 | 2/2008 | Mott | |
| 7,474,668 B2 * | 1/2009 | Bauman et al. | 370/412 |
| 7,623,519 B2 | 11/2009 | Tornetta | |
| 7,817,653 B2 | 10/2010 | Brueggen | |
| 2002/0085578 A1 | 7/2002 | Dell | |
| 2003/0005239 A1 | 1/2003 | Dover | |
| 2003/0018845 A1 | 1/2003 | Janzen | |
| 2003/0182513 A1 | 9/2003 | Dodd | |
| 2005/0172091 A1 | 8/2005 | Rotithor | |
| 2006/0140191 A1 * | 6/2006 | Naik | 370/395.4 |
| 2008/0107105 A1 * | 5/2008 | Reilly et al. | 370/389 |
| 2008/0151894 A1 * | 6/2008 | Maiyuran et al. | 370/392 |
| 2008/0159145 A1 | 7/2008 | Muthukrishnan | |
| 2008/0162760 A1 | 7/2008 | Jacob | |
| 2008/0263239 A1 | 10/2008 | Brueggen | |
| 2009/0103444 A1 | 4/2009 | Khatri | |
| 2009/0172806 A1 | 7/2009 | Natu | |

OTHER PUBLICATIONS

"An Introduction to the Intel® QuickPath Interconnect," Intel Corporation, Jan. 2009.
Aad J. van der Steen, "Overview of recent supercomputers," NCF/HPC Research, Aug. 2008.
Todd Langley et al., "Introduction to Intel® Architecture—The Basics," Intel Corporation, Jan. 2009.
"Intel® QuickPath Architecture," White Paper, Intel Corporation, Apr. 2008.

* cited by examiner

*Primary Examiner* — Hong Cho

(57) ABSTRACT

A circuit includes queue buffers, a bid masking circuit, and a priority selection circuit. Each of the queue buffers carries packets of a respective message class selected from a set of message classes and asserts a respective bid signal indicating that the queue buffer carries a packet that is available for transmission. The bid masking circuit produces a masked vector of bid signals by selectively masking one or more of the bid signals asserted by the queue buffers based on credit available to transmit the packets and on cyclical masking of one or more of the bid signals asserted by ones of the queue buffers selected for packet transmission. The priority selection circuit selects respective ones of the queue buffers from which packets are transmitted based on the masked vector of bid signals produced by the bid masking circuit.

20 Claims, 6 Drawing Sheets

| Output Bus Upper ½: | a1 a3 a5 a7 | b0 b2 b4 | d0 | e1 e3 e5 e7 | f0 |
|---|---|---|---|---|---|
| Output Bus Lower ½: | a0 a2 a4 a6 | a8 b1 b3 | c0 | e0 e2 e4 e6 | e8 |
| Arbitration Cycle: | 1 | 2 | 3 | 4 | 5 |

FIG. 8

RESOURCE ARBITRATION

CROSS-REFERENCE TO RELATED APPLICATIONS

This application relates to co-pending U.S. Patent Application Publication No. 2008/0263239, which is incorporated herein by reference.

BACKGROUND

In the field of computer and computer network design, requests for access to one or more shared resources (e.g., a communications bus controller, a system memory interface, a cache memory controller, a thread or task scheduler, or any other resource in a microprocessor or microprocessor system) typically are allocated by an arbiter, which attempts to efficiently allocate the resources between the resource requests. For example, many networks typically include a plurality of devices that are interconnected through switch fabrics or other types of communication links that must connect the devices to a shared bus with high-reliability, high-speed, and low-latency. Many different arbitration methods have been used to allocate resources, including first-come, first-served arbitration methods, fixed priority methods that assign static priorities to different requests and arbitrates between the requests in order of priority, and round-robin arbitration methods that assign resources to each requester in equal portions and in order.

What are needed are improved apparatus and methods for arbitrating access to shared resources in computing and networking systems.

SUMMARY

In one aspect, the invention features a circuit that includes queue buffers, a bid masking circuit, and a priority selection circuit. Each of the queue buffers carries packets of a respective message class selected from a set of message classes and asserts a respective bid signal indicating that the queue buffer carries a packet that is available for transmission. The bid masking circuit produces a masked vector of bid signals by selectively masking one or more of the bid signals asserted by the queue buffers based on credit available to transmit the packets and on cyclical masking of one or more of the bid signals asserted by ones of the queue buffers selected for packet transmission. The priority selection circuit selects respective ones of the queue buffers from which packets are transmitted based on the masked vector of bid signals produced by the bid masking circuit.

In another aspect, the invention features a method in accordance with which bid signals are asserted from each of multiple physical queue buffers in response to receipt of respective packets that are available from the queue buffers. A masked vector of bid signals is produced by selectively masking one or more of the bid signals based on credit available to transmit the packets and cyclically masking one or more of the bid signals asserted by respective ones of the queue buffers previously selected for packet transmission. Respective ones of the queue buffers from which packets are transmitted are selected in accordance with a fixed prioritization of the queue buffers applied to the masked vector of bid signals. One or more packets are transmitted from the selected queue buffers to a shared physical resource.

The invention also features apparatus that includes the inventive circuit described above and that is operable to implement the inventive method described above.

DESCRIPTION OF DRAWINGS

FIG. 8 is a diagrammatic view of an embodiment of a method by which an embodiment of the arbitration circuit of FIG. 1 issues a series of random packets to a shared resource without bubbles.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition of Terms

As used herein a "computer" is any machine, device, or apparatus that processes data according to computer-readable instructions that are stored on a computer-readable medium either temporarily or permanently.

A "bid signal" (or resource request) is a signal that indicates that a particular buffer has data that is available for transmission.

II. Introduction

The embodiments that are described herein provide improved apparatus and methods for arbitrating access to shared resources in computing and networking systems.

Some embodiments provide arbitration circuits that arbitrate fairly among packets of varying sizes. These embodiments readily may be optimized for efficiency and design simplicity. In these embodiments, the arbitration circuit typically can stream a configurable number of packets from each arbitration winner so that traffic can be balanced optimally.

Some embodiments provide arbitration circuits that efficiently create multiple paths that bypass packets directly to the arbiter when they don't need to be en-queued. The bypass paths readily may be implemented without functional bugs and optimized in terms of physical design. Also, the number of bypass paths is scalable such that more paths can be added (if physically feasible) without greatly increasing the complexity of the implementation.

Some embodiments provide arbitration circuits that pack together packets of variable sizes so that the resulting output stream can be issued to a link with as few bubbles (i.e., unused link cycles) as possible under various constraints (e.g., arbiter design and link protocol).

III. Overview

Figure 1:
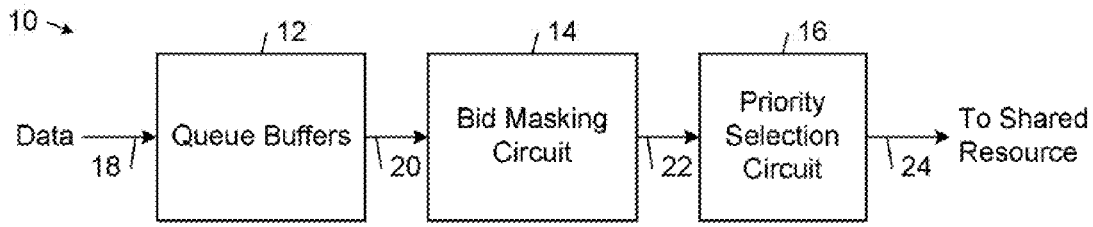
FIG. 1 is a block diagram of an embodiment of an arbitration circuit.

FIG. 1 shows an embodiment of an arbitration circuit 10 that includes queue buffers 12, a bid masking circuit 14, and a priority selection circuit 16. The queue buffers 12 receive data 18 and assert a vector 20 of bid signals each of which indicates that a respective one of the buffers 12 has data that is available to transmit. The bid masking circuit 14 selectively masks respective ones of the bid signals in the vector 20 to produce a masked vector 22 of bid signals. Based on the masked vector 22 of bid signals, the prioritization circuit 16 automatically connects a respective one of the queue buffers to an output 24 that is connected to a shared resource (e.g., a link controller).

The queue buffers 12 may be implemented by any type of data storage device(s) that is capable of storing data (typically in the form of packets) and asserting a bid signal (which also may be referred to as a resource request). In some embodiments, each queue buffer includes a respective set of data registers. Each of the data registers corresponds to a queue slot and typically includes a field that stores data or instruction that is associated with a resource request and a field that stores a respective bid signal (e.g., a flag or bit value) that indicates whether or not the data register currently is storing a pending resource request.

The bid masking circuit 14 may be implemented by any type of circuit that is capable of receiving the vector 20 of bid signals from the queue buffers 12 and selectively masking one or more of the bid signals in the vector 20 based on one or more criteria (e.g., fairness and load balancing considerations). In this context, the term masking means that an asserted bid signal effectively is de-asserted such that the priority selection circuit 16 does not consider the associated queue as having data that currently is available for transmission.

The priority selection circuit 16 may be implemented by any type of circuit that is capable of selecting a respective one of the queue buffers 12 based on a set of input bid signals. In some embodiments, the priority selection circuit 16 is implemented in accordance with the priority selection approach that is described in U.S. Patent Application Publication No. 2008/0263239. In these embodiments, the priority selection circuit 16 simultaneously prioritizes and selects the data from a respective one of the queue buffers 12 based on a preselected prioritization of the queue buffers 12.

Figure 2:
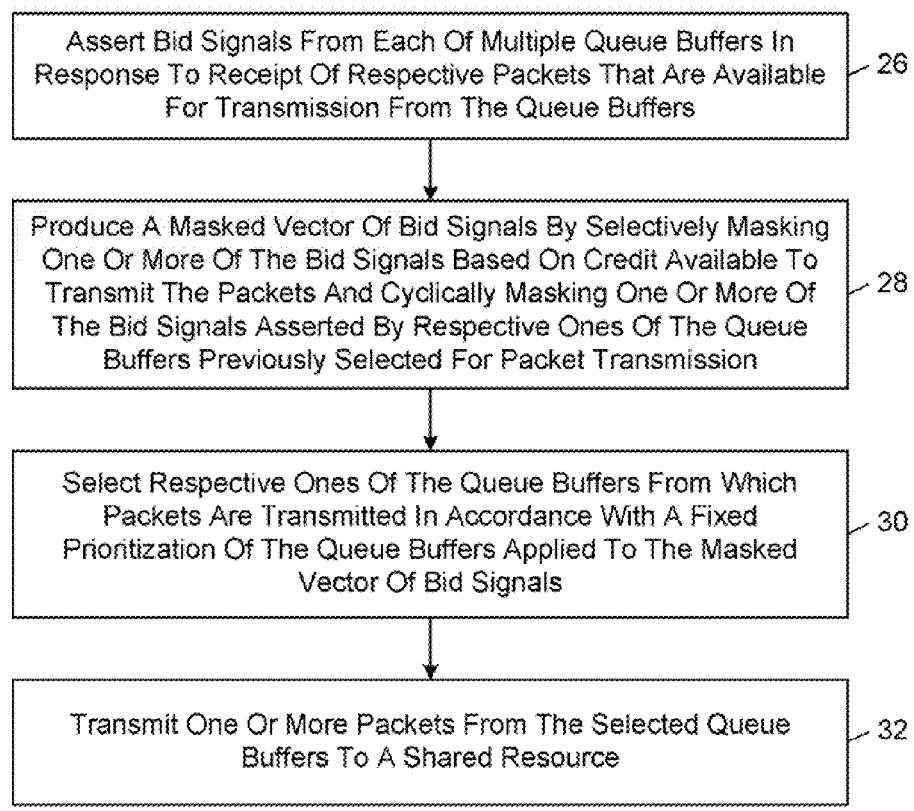
FIG. 2 is a flow diagram of an embodiment of an arbitration method.

FIG. 2 shows an embodiment of an arbitration method that is implemented by the arbitration circuit 10. In accordance with this method, the queue buffers 12 assert the vector 20 of bid signals in response to receipt of respective packets that are available for transmission from the buffers 12 (FIG. 2, block 26). The bid masking circuit 14 produces the masked vector 22 of bid signals by selectively masking one or more of the bid signals based on credit that is available to transmit the packets and cyclically masking one or more of the bid signals in the vector 20 that are asserted by respective ones of the queue buffers that previously were selected for packet transmission (FIG. 2, block 28). The prioritization circuit 16 selects respective ones of the queue buffers from which packets are transmitted in accordance with a fixed prioritization of the queue buffers that is applied to the masked vector 22 of bid signals (FIG. 2, block 32).

IV. Exemplary Embodiments of the Arbitration Circuit

In this section, embodiments of the arbitration circuit 10 are described in the context of a server chip that provides a bridge between a switching fabric of links and an Intel® QuickPath Interconnect (QPI) that interfaces with one or more microprocessors (see, e.g., "An Introduction to the Intel® QuickPath Interconnect," Intel Corporation, January 2009).

In accordance with the QPI specification, in the physical layer, a link pair consists of two unidirectional links that operate simultaneously in full, half, and quarter widths of a full link that has twenty one-bit lanes. The operational width is identified during initialization. A phit contains all the information transferred by the physical layer on a single clock edge (e.g., 20 bits at full-width, 10 bits at half-width 10 bits, and 5 bits at quarter-width).

The link layer presents a set of higher-level services to the stack. These services include multiple message classes and multiple virtual networks, and together are used to prevent protocol deadlocks. The smallest unit of measure at the link layer is a "flit" (flow control unit), which is 80 bits long (i.e., 4 phits on a full-width link) regardless of the link width. The link layer supports multiple protocol layer message classes (six currently are defined), which provide independent transmission channels (virtual channels) to the protocol layer. The link layer supports up to three virtual networks: up to two independently buffered virtual networks (VN0 and VN1) and one shared adaptive buffered virtual network (VNA). Each message class is subdivided among the three virtual networks.

The link layer uses a credit/debit scheme for flow control. In accordance with this scheme, a sender is given a set number of credits (representing either a packet or a flit) to send packets, or flits, to a receiver. Whenever a packet or flit is sent to the receiver, the sender decrements its credit counters by one credit. Whenever a buffer is freed at the receiver, a credit is returned to the sender for that buffer. When the sender's credits for a given channel have been exhausted, it stops sending on that channel. Each packet contains an embedded flow control stream that returns credits from a receiving link layer entity to a sending link layer entity after the receiving link layer has consumed the received information, freed the associated receiving queue buffers, and is ready to receive more information into those buffers.

A. Fair Arbitration Among Packets of Varying Sizes

Figure 3:
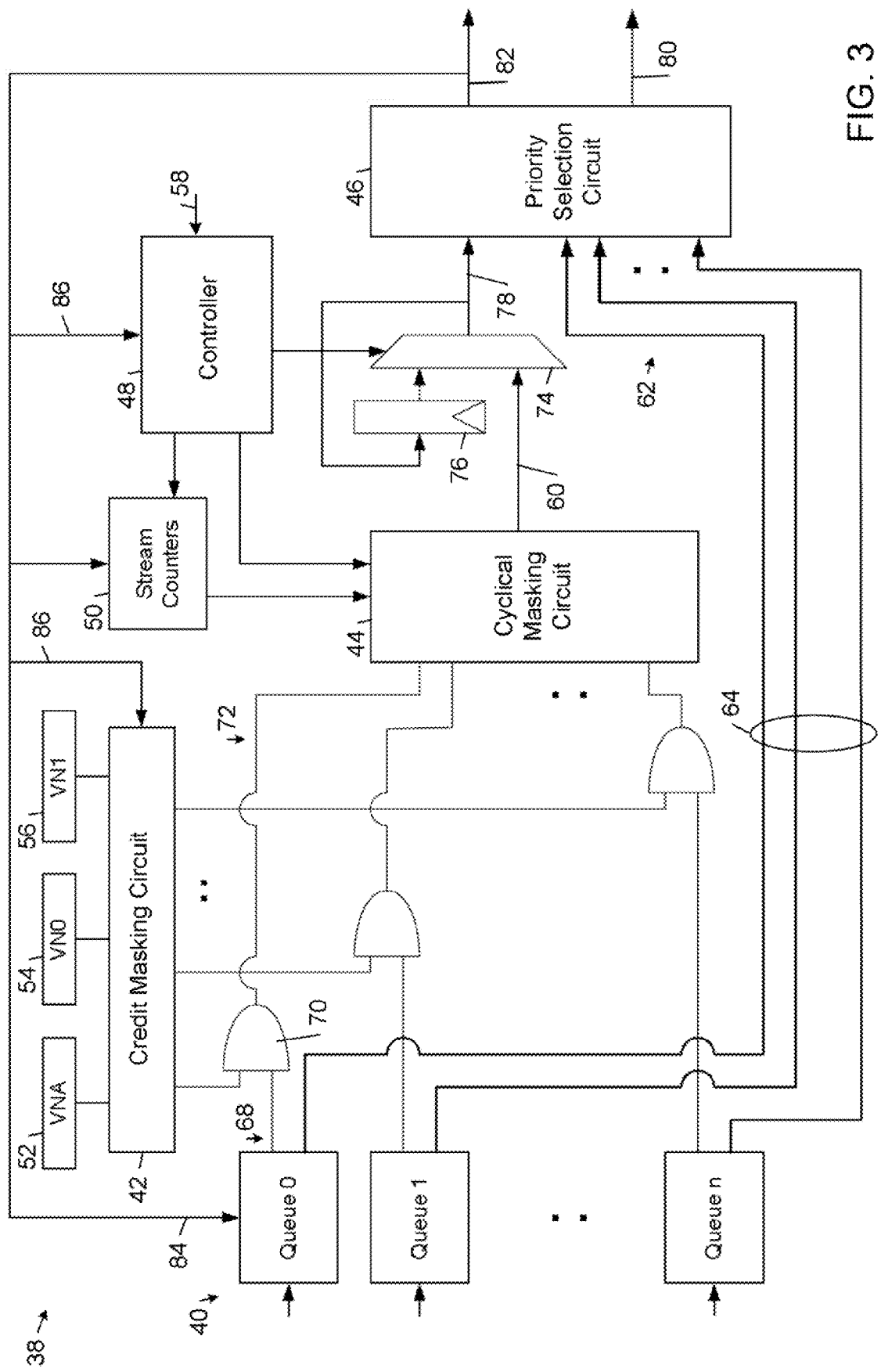
FIG. 3 is a block diagram of an embodiment of the arbitration circuit shown in FIG. 1.

FIG. 3 shows an embodiment 38 of the arbitration circuit 10 that arbitrates fairly among packets of varying sizes. The link arbitration process that is implemented by the arbitration circuit 38 is non-complex such that the arbitration circuit 38 can be implemented easily without substantial risk of functional bugs. The arbitration circuit 38 also is efficient, which minimizes packet latency and maximizes throughput. The arbitration circuit 38 also allows configurable streaming of packets from each queue that wins arbitration, enabling software to balance traffic for best performance.

The arbitration circuit 38 includes a plurality of queue buffers 40 (Queue 0, . . . , Queue n), a credit masking circuit 42, a cyclical masking circuit 44, a priority selection circuit 46, a controller 48, and stream counter circuits 50. The arbitration circuit 38 also includes counter blocks 52, 54, 56 that represent the available QPI link credit. In the illustrated embodiment, the arbitration circuit 38 operates in a clock domain that is ⅛ the link frequency, such that it receives packets from various senders either 1 or 2 flits per cycle, and may issue packets to the link controller (serializer logic) either 1 or 2 flits per cycle.

The counter block 52 (labeled "VNA") is a 7-bit counter that is used to track up to 127 general (VNA) credits, which are consumed per-flit. The counter block 54 (labeled "VN0") is a set of six, 2-bit counters that track up to three VN0 credits per message class, credits which are consumed per-packet. The counter block 56 (labeled "VN1") is another set of six, 2-bit counters that track up to three VN1 credits per message class, credits which also are consumed per-packet. The credit counters 52-56 are incremented when credit is received from the inbound QPI link, and decremented as the priority selection circuit 46 issues a packet that uses available credit.

Each of the queue buffers 40 carries packets belonging to a single QPI message class, but there may be multiple queues carrying packets per message class. The queue buffers can carry packets of differing sizes. Each queue buffer has an associated bid signal and an associated data output signal. The bid signals are asserted onto a set of bit paths 68 (which represent a vector of bid signals) when the associated queue buffers have packets that are available for output onto a set 64 of multi-bit data buses. The arbitration circuit 39 receives configuration bits 58 (per queue) from, for example, a software programmable register that can be used to specify the maximum number of packets to stream from each queue.

The credit masking circuit 42 and the cyclical masking circuit 44 qualify the vector 68 of bid signals that are asserted by the queue buffers 40 in order to realize fairness and configurability.

The credit masking circuit 42 qualifies the vector 68 of bid signals based on the presence of available credit. If neither VNA nor VN0/1 credit is available for the packets carried by a given queue, the bid from that queue will be suppressed. Note that the credit is qualified on a per-queue basis by logic that ensures fair usage of credit. There may be multiple queues carrying packets in a single QPI message class, and only a single VN0/1 credit available for that message class. In that case, the credit masking circuit 42 uses a rotating hot-seat to guarantee that each queue has an opportunity to use the VN0/1 credit. When that hot-seat is parked on a queue, VN0/1 credit will be masked for other queues carrying packets in the same message class. There is a similar hot-seat to guarantee fair usage of VNA credit in order to prevent a case where a single queue keeps managing to win VNA credit as it becomes available, while other queues are limited to VN0/1 credit. The qualified credit per queue is used to mask each queue bid signal as represented by the "AND" gates 70 in FIG. 3. The outputs 72 of the AND gates 70 represent a credit qualified vector of bid signals.

In some embodiments, the cyclical masking circuit 44 masks off the asserted bid signals in the credit qualified vector 72 in accordance with a pseudo round-robin arbitration. In these embodiments, the asserted bid signals in the credit qualified vector 72 are masked as the associated queue buffers win arbitration (i.e., are selected by the priority selection circuit 46). When there are no remaining unmasked bids, the cyclical mask is cleared and bidding starts again with the "least-significant" queue (e.g., Queue n) having priority. Configurable streaming of packets from the queue buffer that wins arbitration (i.e., is selected by the priority selection circuit 46) in two distinct fashions. For queues carrying single-flit packets, the controller 48 is able to see how many packets are currently in the queue, and it may combine multiple packets (up to the maximum number specified) into a single macro-packet. For queues carrying multi-flit packets, the controller maintains a small counter that tracks how many packets have been issued from that queue since the last time the cyclical bid-vector mask was cleared. The arbiter won't set the bit in the bid-vector mask for that queue until the counter value reaches the maximum specified stream value. The cyclical masking circuit 44 outputs a masked vector 60 of bid signals to the input of a multiplexer circuit 74.

The controller 48 controls how the masked bid vector is presented to the priority selection circuit 46. The controller 48 determines the number of flits in each packet or macro-packet and stores the current masked bid vector 60 in a register 76 for the number of cycles required for the packet to be transmitted from the selected queue buffer. The controller 48 also clears the stream counters 50 and cyclical bid-vector mask at the end of each arbitration cycle (when there are no remaining unmasked bids).

The priority selection circuit 46 has an input 78 that receives the masked vector 60 of bid signals from the multiplexer 74 and inputs 62 that are coupled to the set 64 of multi-bit data buses, each of which corresponds to a respective one of the bids. In some embodiments, the priority selection circuit 46 simultaneously outputs the priority-encode result of the masked vector 78 of bid signals and data on the multi-bit bus 63 corresponding to the selected queue buffer. In particular, the priority selection circuit 46 selects the packet presented by the "least-significant" bidding queue whose asserted bid was not masked by either the credit masking circuit 42 or the cyclical masking circuit 44.

The priority selection circuit 46 also has the following outputs: a bus 80 that carries 0, 1, or 2 valid flits from the selected queue buffer; and detailed control information 82 representing which queue was selected and the number of flits that were transmitted from that queue buffer in the current cycle. The control information 82 is processed and fed back to the other components of the arbitration circuit 38. This information includes a de-queue signal 84 that is sent to each of the queue buffers 40 to update its read pointer as packet(s) are pulled from the queue buffer. Each of the stream counters 50 is incremented by a qualified version 86 of the de-queue signal that is only asserted for packet headers. The same "header de-queue" signal 86 also is input into the credit masking circuit 42 in order to update state related to the logic that ensures fair usage of QPI credit.

Figure 4:
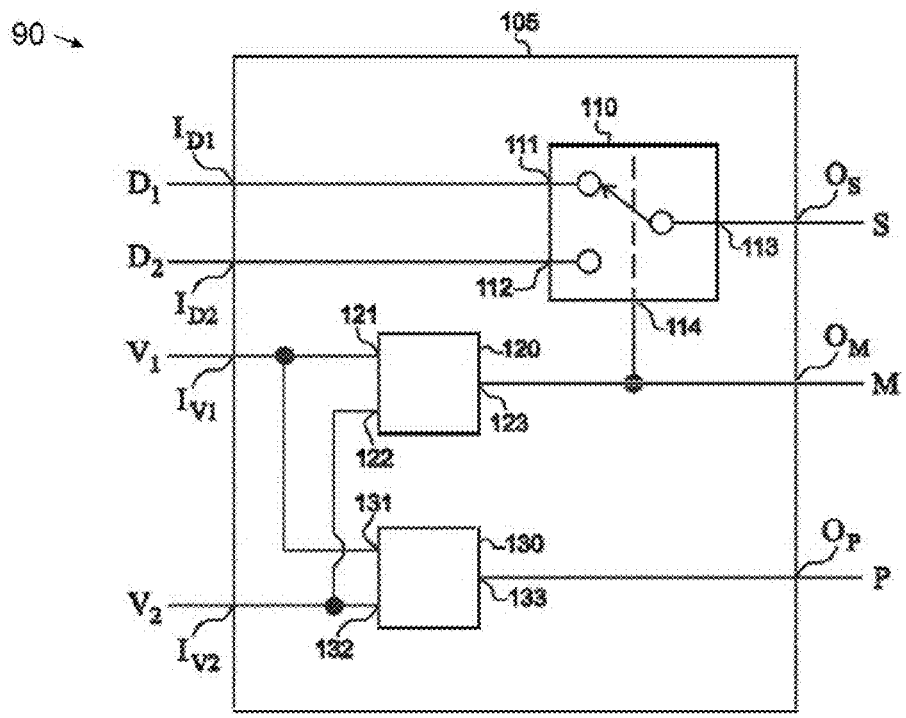
FIG. 4 is a block diagram of an embodiment of a priority selection circuit.

FIG. 4 shows an embodiment 90 a priority selection circuit that may be incorporated into embodiments of the priority selection circuit 46. The priority selection circuit 90 includes a selection module 105 that has a switch 110, a switch control module 120, and a detection module 130. The switch 110 has a first switch input 111, a second switch input 112, a switch output 113, and a switch control input 114. The switch control module 120 has a first switch-control-module input 121, a second switch-control-module input 122, and a switch-control-module output 123. The detection module 130 has a first detection-module input 131, a second detection module input 132, and a detection-module output 133.

The first switch input 111 is coupled to a first data input $I_{D1}$ where it is configured to receive a first data signal $D_1$. The second switch input 112 is coupled to a second data input $I_{D2}$ where it is configured to receive a second data signal $D_2$. The first switch-control-module input 121 is coupled to a first validation input $I_{V1}$ where it is configured to receive a first validation signal $V_1$. The second switch-control-module input 122 is coupled to a second validation input $I_{V2}$, where it is configured to receive a second validation signal $V_2$. The first switch-control-module input 121 is internally coupled to the first detection-module input 131. The second switch-control-module input 122 is internally coupled to the second detection-module input 132. The switch control module output 123 is internally coupled to the switch control input 114.

The switch output 113 is coupled to a selected data output $O_S$ where the selection module 105 outputs as appropriate a selected signal S. The switch-control-module output 123 and the internally coupled switch control input 114 are coupled to a marker output $O_M$ where the selection module 105 outputs as appropriate a marker signal M. The detection-module output 133 is coupled to a presence output $O_P$ where the selection module 105 outputs as appropriate a presence signal P.

In operation, the first validation signal $V_1$ (which is received at the first validation input $I_{V1}$) identifies whether or not the first data signal $D_1$ (which is received at the first data input $I_{D1}$) is valid. The second validation signal $V_2$ (which is received at the second validation input $I_{V2}$) identifies whether or not the second data signal $D_2$ (which is received at the second data input $I_{D2}$) is valid. The presence signal P outputted at the presence output $O_P$ identifies whether or not at least one of the data signals $D_1$ and $D_2$ is valid. In this representative embodiment, the first data input $I_{D1}$ has an assigned selection priority that is higher than that assigned to the second data input $I_{D2}$. If at least one of the data signals $D_1$ and $D_2$ is identified as valid, the valid data signal $D_1$, $D_2$ having the higher assigned priority is transferred to the selected data output $O_S$. The marker signal M at the marker output $O_M$ identifies from which data input $I_{D1}$, $I_{D2}$ the transferred data signal $D_1$, $D_2$ was transferred. In FIG. 4, the priority selection circuit 90 is configured such that a valid first data signal $D_1$ received at the first data input $I_{D1}$ has a higher priority than a valid second data signal $D_2$ received at the second data input $I_{D2}$.

Embodiments of the priority selection circuit 46 may incorporate a plurality of the priority selection circuit 90 as disclosed in U.S. Patent Application Publication No. 2008/0263239.

Figure 5:
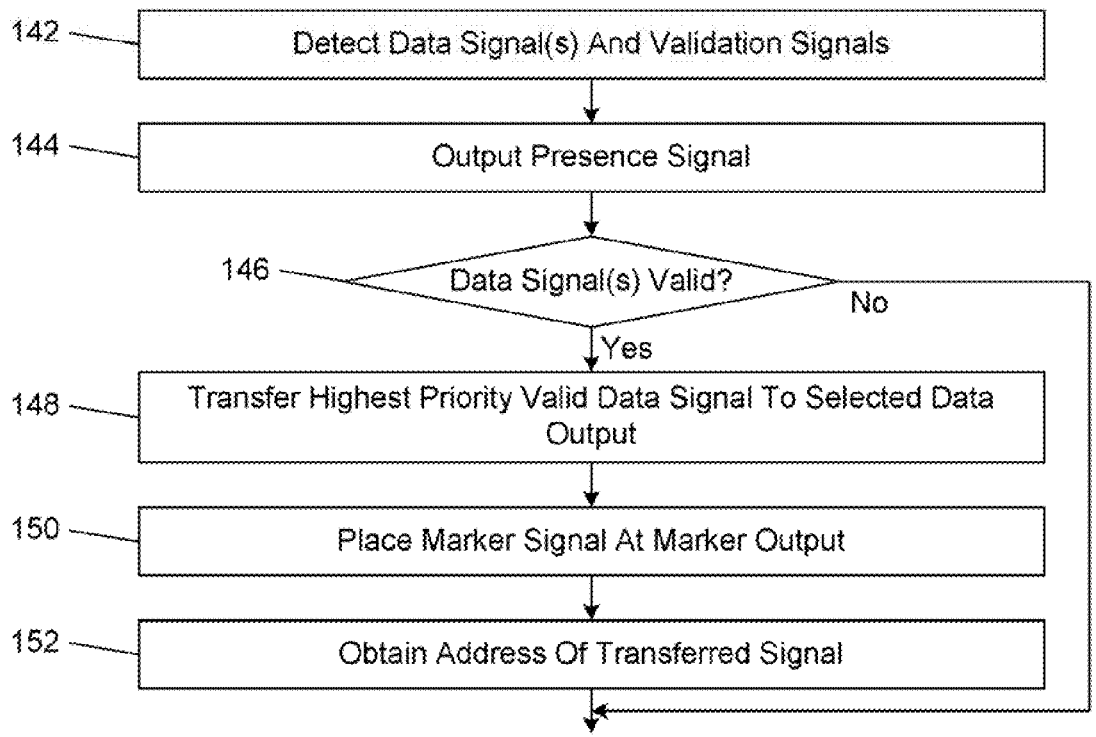
FIG. 5 is a flow diagram of an embodiment of a priority selection method.

FIG. 5 shows an embodiment of a method that is implemented by the priority selection circuit 90. In accordance with this method, the priority selection circuit 90 simultaneously detects the various data signals and validation signals at the data inputs 62 and the validation inputs 78 (FIG. 2, block 142). The priority selection circuit 90 outputs presence signals P identifying whether or not at least one data signal 62 is valid (FIG. 5, block 144). If none of the data signals is valid (FIG. 5, block 146), the process terminates. Otherwise, the priority selection circuit 90 transfers the valid data signal having the highest assigned priority to the selected data output (FIG. 5, block 148). The priority selection circuit 90 outputs marker signals M at the appropriate marker outputs $O_M$ identifying from which data input the selected data signal was transferred (FIG. 5, block 150). The priority selection circuit 90 then obtains the address of the input signal that was transferred to the selected data output (FIG. 5, block 152).

B. Arbitration With Queue Bypass Paths

Some embodiments provide arbitration circuits that efficiently create multiple paths that bypass packets directly to the arbiter when they don't need to be en-queued, thereby saving one or more cycles of latency. The bypass paths readily may be implemented without functional bugs and optimized in terms of physical design. Also, the number of bypass paths is scalable such that more paths can be added (if physically feasible) without greatly increasing the complexity of the implementation.

Figure 6:
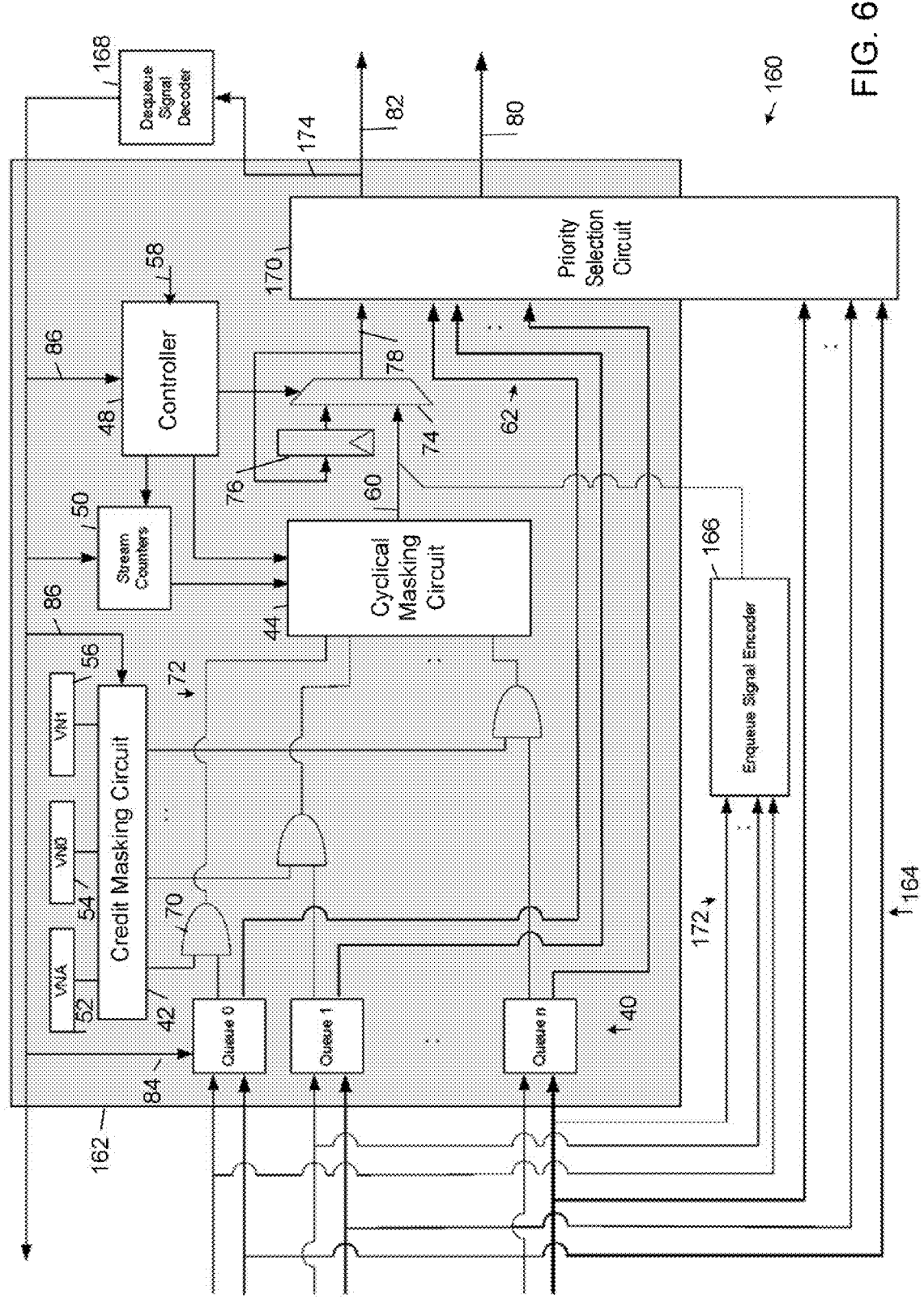
FIG. 6 is a block diagram of an embodiment of the arbitration circuit shown in FIG. 1.

FIG. 6 shows an embodiment 160 of the arbitration circuit 10 that integrates an embodiment 162 of the arbitration circuit 38 with multiple bypass data paths 164, an en-queue signal encoder 166, and a de-queue signal encoder 168. In this embodiment, the arbitration circuit 162 differs from the arbitration circuit 38 (shown in FIG. 3) in the following ways.

First, the priority selection circuit 170 of the arbitration circuit 162 has been extended to handle a wider vector of bid signals and a correspondingly larger number of input data buses than the priority selection circuit 46.

Second, the input buses that carry packet data to the inputs to the queue buffers 40 are connected directly to the extended data bus inputs of the priority selection circuit 170 by the bypass data paths. The data bus inputs of the priority selection circuit 170 have a priority order from highest to lowest, where the highest priority data bus inputs 62 are connected to the queue buffers 40 and lowest priority data bus inputs are connected to the bypass paths 164.

Third, the control signals 172 that are used to push packets into the queue buffers 40 are inputs to the queue buffers 40 as well as inputs to the en-queue signal encoder 166, which converts the control signals 172 to bid signals. Those bid signals are appended to the vector of bid signals that originate from the queues so there's a bid signal corresponding to each bus input to the priority encoder/multiplexer.

Fourth, the control outputs 174 of the priority selection circuit 170 passed to the de-queue signal decoder 168, which decodes the control outputs into de-queue signals 84 and credit return signals 86. In particular, the priority selection circuit 170 outputs a wider vector of control signals than the priority section circuit 46. For each queue, there is the normal set of signals that indicates a packet unit has been removed from the queue buffer, and there is an additional set of signals that indicate a packet unit has been bypassed around that queue buffer. The de-queue signal decoder 168 combines these two sets of signals per queue.

From the perspective of the priority selection circuit 170, each bypass path appears to be a lower priority queue that doesn't participate in the fair arbitration. In particular, when en-queue signal(s) to the queues are asserted, it causes corresponding bypass bids to be asserted to the priority selection circuit 170. If the priority selection circuit 170 is busy, it will be using a stored version of the masked bid vector 60 that it saved during the previous arbitration cycle and it will ignore new bids. If the bypass bids get asserted during an arbitration cycle, they will be presented to the priority selection circuit 170. If any non-bypass bids are present (i.e., asserted and not masked), those will be higher priority than the bypass bid(s), so the bypass bid(s) will be ignored. Thus, the only time a bypass occurs is when a packet arrives during a cycle when the arbitration circuit 160 is idle and no packets are present in queues.

C. Variable Size Packet Packing

Some embodiments of the arbitration circuit 10 pack together packets of variable sizes so that the resulting output stream can be issued to a shared resource (e.g., a link controller) with as few bubbles (i.e., unused link cycles) as possible under various constraints (e.g., arbiter design and link protocol). In this way, the maximum possible bandwidth can be achieved when the link is busy and the lowest average latency can be achieved when the link is not busy.

In the illustrated embodiments, packets are of variable size and composed of some number of 80-bit units referred to as "flits." Each flit is transported on the link in 4 cycles at the QPI link frequency, but the arbitration circuits operate in a slower clock domain (i.e., ⅛ the link frequency in the illustrated embodiments). In the slower clock domain, the arbitration circuits submit 0, 1 or 2 flits per cycle to the link controller (serializer logic). The queues, which carry packets awaiting arbitration, also receive packets 0, 1 or 2 flits per cycle. Thus, the arbitration circuits must handle packets of variable size that don't arrive in the queues in an optimal format. Many packets are only 1-flit in size, and bubbles would be incurred if the arbitration circuit 200 issued those packets to the link controller one-per-cycle. Instead, the arbitration circuits 200 solve the problem by packing single-flit packets together into multi-flit "macro" packets (at least two flits in size) wherever possible. A similar problem exists where the arbitration circuit 200 could decide to issue a multi-flit packet, and find that only the first flit of the packet is available in a selected queue 12. The arbitration circuits solve this problem by: (1) allowing variable packet alignment so that the flit may be issued along with the final flit of a previous packet or (2) identifying the case, and stalling that packet to wait until more flits are available (assuming other packets are available to send instead). In some embodiments, the link controller interface is two flits wide; in these embodiments, the arbitration circuits are configured to handle multi-flit packets that generally consist of an odd number of flits by optimally packing them together on the two-flit wide interface.

Figure 7:
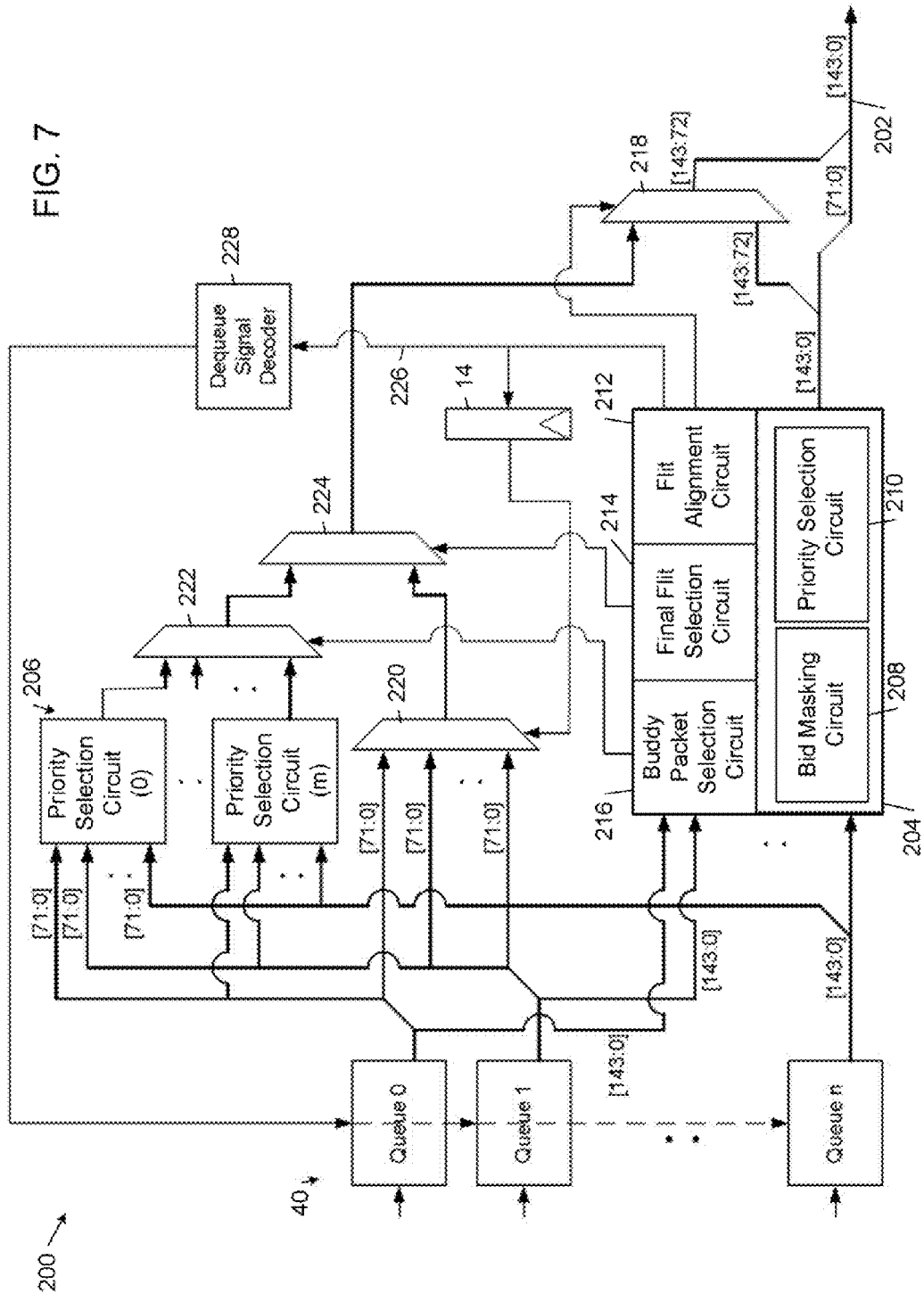
FIG. 7 is a block diagram of an embodiment of the arbitration circuit shown in FIG. 1.

FIG. 7 shows an embodiment 200 of the arbitration circuit 10 that packs together packets of variable sizes so that the resulting output stream can be issued to a shared resource (i.e., a link controller) with as few bubbles (i.e., unused link cycles) as possible under various constraints (e.g., arbiter design and link protocol). The arbitration circuit 200 includes a set of queues 40, a fair arbitration circuit 204, and a set of priority selection circuits 206 (Priority Selection Circuit (0), . . . , Priority Selection Circuit (m)). The fair arbitration circuit 204 includes embodiments 208, 210 of the bid masking circuit 14 and the priority selection circuit 16, which may be implemented as described above in connection with the arbitration circuit 38 (see FIG. 3). The fair arbitration circuit 204 additionally includes a flit alignment circuit 212, a final flit selection circuit 214, and a buddy packet selection circuit 216. Each of the priority selection circuits 206 also may be implemented as described above in connection with the priority selection circuit 46 in the arbitration circuit 38 (see FIG. 3).

In operation, packets arrive into the queues 40 in various formats. For example, some of the queues 40 carry single-flit packets, and those queues may have two or three inputs, so up to three packets could arrive in the queue in the same cycle. Other queues carry odd-sized multi-flit packets, and up to two flits could arrive in the queue in a given cycle. After arbitration, packets are issued to the link controller by the 2-flit wide bus 202. Note that flits are defined as 72-bit units in the illustrated embodiment.

The priority selection circuit 210 in the fair arbitration circuit 204 selects one queue at a time from all queues 40 that have a packet available to issue. The priority selection circuit 210 can pull one or two flits per cycle from the selected queue. If pulling two flits, the flit alignment circuit 212 will control a multiplexer 218 on the upper half of the output bus so that it selects the upper flit from the fair arbitration circuit 204. Otherwise, the multiplexer 218 and the multiplexers 220, 222, 224 that feed into it may be configured to put a flit from a different queue onto the upper half of the output bus 202.

The fair arbitration circuit 204 outputs a set of 2-bit de-queue signals 226 when flit(s) are pulled from the queues 40. Since flits may be pulled from multiple queues in the same cycle, de-queue signals to the multiple queues may be asserted in the same cycle. A de-queue signal decoder 228 decodes the de-queue signals 226 based on the fair arbiter selection and alternate flit selection for the upper half of the output bus to generate the de-queue signals 230, which are fed back to the queues 40 in order to update the queues' read pointers when flit(s) are pulled from the queues 40.

There are four scenarios in which the fair arbitration circuit 204 may pull only a single flit from the queue that wins arbitration: 1) the selected queue carries single flit packets and only a single packet is available; 2) the selected queue carries multi-flit packets, but only the first flit of a packet is available; 3) the selected queue carries single flit packets, and the fair arbitration circuit 204 has combined a number of them into a macro packet, the fair arbitration circuit 204 is almost done pulling the macro packet from the queue, and only one flit is remaining; and 4) the fair arbitration circuit 204 is almost done pulling a multi-flit packet from the selected queue, and only one flit is remaining.

Cases (3) and (4) are essentially the same in terms of the way in which the fair arbitration circuit 204 packs packets together on the link. The first way the fair arbitration circuit 204 optimally packs packets is by aligning their flits to eliminate bubbles on the output bus. Note that the flit carried on the lower half of the output bus 202 will always go first on the QPI link, followed by the flit on the upper half. The fair arbitration circuit 204 always arbitrates for a new packet when there are zero or one flits remaining of the current packet. If there are zero flits remaining to send, and the fair arbitration circuit 204 is able to send two flits of the new packet (or macro packet) it will do so. If there is one flit remaining of the previous packet, the fair arbitration circuit 204 will send that flit on the lower half of the output bus, along with the first flit of the new packet on the upper half of the output bus 202.

If the fair arbitration circuit 204 is only able to pull a single flit from the selected queue (case (1)), there are two possibilities for sending another flit on the output bus 202 in the same cycle. The fair arbitration circuit 204 may be sending the final flit of the previous packet, and it will send the new single-flit packet along with that one. Otherwise, the fair arbitration circuit 204 will attempt to find a buddy single-flit packet in a different queue to send along with the selected packet. The priority selection circuits 206 are used to choose a buddy packet for a given single-flit packet selected by the fair arbitration circuit 204. Each of the priority selection circuits 206 will only select from queues other than the one carrying the primary packet, and a different priority order will be used in each case, so that each single-flit packet queue has a fairly equal chance of being chosen to provide a buddy packet. Buddy packets are opportunistic, so they don't affect the fair arbitration.

In some embodiments, case (2) is handled in the same way as case (1); that is, by selecting a buddy single-flit packet to send along with the initial flit of the primary packet with the buddy packet being issued on the lower half of the output bus. In other embodiments, the fair arbitration circuit 204 executes a method that prevents case (2) from arising. In these embodiments, whenever a packet is first arriving in a queue such that a bubble would be incurred if the packet was immediately transmitted, the fair arbitration circuit 204 does not select that packet if it sees any other packet ready to issue.

FIG. 8 shows an example of how the arbitration circuit 200 issues a series of random packets to the link controller without bubbles. In this example, packet flits are represented by pairs. The upper half of the output bus 202 is represented by the upper line of packet flits, and the lower half of the output bus 202 is represented by the lower line of packet flits. At the first arbitration point (1), a 9-flit packet ("a") wins arbitration. The first two flits of the packet are issued to the link controller, followed by two more flits each cycle until the next arbitration point (2). At that point, the arbitration circuit 200 selects a queue that carries 1-flit packets. Streaming configuration allows the arbitration circuit 200 to pull five packets from that queue, combined into a 5-flit macro packet ("b"). The arbitration circuit 200 sends the first flit of that macro packet along with the final flit of the previous packet. Then the arbitration circuit 200 sends two more flits each cycle until the packet is completely issued. At the next arbitration point (3), the arbitration circuit 200 selects a queue carrying a single 1-flit packet ("c"). The arbitration circuit 200 is able to send two flits in that cycle, so a secondary "buddy" packet ("d") is issued on the upper half of the output bus 202. There's another arbitration point (4) in the next cycle, and the arbitration circuit 200 selects a 9-flit packet ("e"). The arbitration circuit 200 sends two flits of that packet per cycle until the next arbitration point (5). In that cycle, the arbitration circuit 200 selects another 1-flit packet ("f"), and sends it along with the final flit ("e8") of the previous packet.

V. Conclusion

The embodiments that are described herein provide improved apparatus and methods for arbitrating access to shared resources in computing and networking systems.

Other embodiments are within the scope of the claims.

The invention claimed is:

1. A circuit, comprising:
queue buffers, wherein each of the queue buffers is configured to carry packets of a respective message class selected from a set of message classes and to assert a respective bid signal indicating that the queue buffer carries a packet that is available for transmission;
a bid masking circuit operable to produce a masked vector of bid signals by selectively masking one or more of the bid signals asserted by the queue buffers based on credit available to transmit the packets and on cyclical masking of one or more of the bid signals asserted by ones of the queue buffers selected for packet transmission; and
a priority selection circuit operable to select respective ones of the queue buffers from which packets are transmitted based on the masked vector of bid signals produced by the bid masking circuit.

2. The circuit of claim 1, wherein the bid masking circuit is operable to selectively mask asserted ones of the bid signals based on amounts of credit currently available for each of the message classes, wherein the bid masking circuit masks the bid signals asserted by ones of the queue buffers carrying packets of a message class for which credit currently is unavailable and, on a rotating basis, the bid masking circuit allocates credit currently available for any particular one of the message classes to respective ones of the queue buffers carrying packets of the particular message class.

3. The circuit of claim 1, wherein, during each of multiple arbitration cycles, the bid masking circuit applies a cyclical mask to ones of the bid signals asserted by respective ones of the queue buffers selected by the priority selection circuit until all the asserted bid signals are masked, at which point the bid masking circuit clears the cyclical mask.

4. The circuit of claim 1, further comprising a controller operable to control streaming of packets from the priority selection circuit through controlled presentation of the masked vector of bid signals to the priority selection circuit.

5. The circuit of claim 4, wherein the controller is operable to cause the priority selection circuit to combine multiple single-flit packets from a selected one of the queue buffers into a single macro-packet based on a determined quantity of packets in the selected queue buffer.

6. The circuit of claim 4, wherein the controller is operable to cause the priority selection circuit to stream multi-flit packets from a selected one of the queue buffers until a specified number of packets has been streamed from the selected queue buffer, at which point the controller modifies the masked vector of bid signals to include a mask of the bid signal asserted by the selected queue buffer.

7. The circuit of claim 1, wherein each of the queue buffers comprises a respective data output and a respective data input that is coupled to an associated input bus, and further comprising for each of the queue buffers a respective queue bus that couples the respective data output to a respective queue data input of the priority selection circuit.

8. The circuit of claim 7, further comprising respective bypass buses coupling the input buses to respective bypass bus data inputs of the priority selection circuit.

9. The circuit of claim 8, wherein the priority selection circuit selects packets for respective ones of the queue buses and the bypass buses in accordance with a fixed prioritization of the data inputs of the priority selection circuit, and the queue buses are coupled to inputs of the priority selection circuit that are higher in priority than the inputs of the priority selection circuit that are coupled to the bypass buses.

10. The circuit of claim 8, wherein each of the queue buffers comprises a respective control input that receives a respective control signal for en-queuing packets into the queue buffer, and further comprising an encoder that converts the control signals into respective bypass bus bid signals and appends the bypass bid signals to the masked vector of bid signals.

11. The circuit of claim 10, wherein the encoder asserts a respective one of the bypass bus bid signals in response to an assertion of the respective control signal at the respective control input of the queue buffer, and the priority selection circuit is configured to select data from a respective one of the bypass buses associated with an asserted bypass bid signal only during arbitration cycles when the queue buffers have failed to assert any bid signals.

12. The circuit of claim 8, wherein the priority selection circuit outputs a respective de-queue signal of a first type for each packet that has been removed from an associated one of the queues and a respective de-queue of a second type for each packet from a respective one of the input buses that has bypassed the associated queue buffer via the respective bypass bus, and further comprising a de-queue signal decoder that, for each of the queue buffers, combines the respective de-queue signals of the first and second types to produce a respective de-queue control signal that controls the de-queuing of data packets from the queue buffer.

13. The circuit of claim 1, further comprising a controller that causes the priority selection circuit to select one of the queue buffers at a time and to submit flits of a next available packet on the selected queue buffer for transmission on a multi-flit wide output bus.

14. The circuit of claim 13, wherein the controller causes the priority selection circuit to align flits from multiple packets onto the output bus in order to avoid bubbles in the output bus in response to a determination that an insufficient number of flits is available for the priority selection circuit to fill the output bus.

15. The circuit of claim 14, wherein, in response to determinations that the output bus is unfilled, there are zero flits remaining in the current packet, and there is a sufficient number of flits of another available packet to fill the output bus, the controller causes the priority selection circuit to submit the sufficient number of the flits of the other available packet for transmission on the output bus.

16. The circuit of claim 14, wherein, in response to determinations that the output bus is partially filled, there is one flit remaining in the packet being transmitted, and there is a sufficient number of flits of another available packet to fill the output bus together with the remaining one flit of the packet being transmitted, the controller causes the priority selection circuit to submit the remaining one flit of the packet being transmitted and the sufficient number of the flits of the other available packet to fill the output bus.

17. The circuit of claim 16, wherein the output bus has a width of two flits and, in response to a determination that there is a single-flit packet available for transmission, the controller causes the priority selection circuit to submit the remaining one flit of the current packet and the single-flit packet for transmission on the output bus.

18. The circuit of claim 16, further comprising at least one priority arbitration circuit, and wherein the controller is operable to cause the priority arbitration circuit to search for the single-flit packet from a respective one of the queue buffers that currently is unselected by the priority selection circuit.

19. The circuit of claim 14, wherein, in response to determinations that the next available packet is a multi-flit packet, only a first flit of the multi-flit packet currently is available, and another packet currently is available for transmission, the controller causes the priority selection circuit to transmit the other currently available packet instead of the first flit of the multi-flit next available packet.

20. A method, comprising:
asserting bid signals from each of multiple physical queue buffers in response to receipt of respective packets that are available from the queue buffers;
producing a masked vector of bid signals by selectively masking one or more of the bid signals based on credit available to transmit the packets and cyclically masking one or more of the bid signals asserted by respective ones of the queue buffers previously selected for packet transmission;
selecting respective ones of the queue buffers from which packets are transmitted in accordance with a fixed prioritization of the queue buffers applied to the masked vector of bid signals; and
transmitting one or more packets from the selected queue buffers to a shared physical resource.

* * * * *